United States Patent
Xu et al.

(10) Patent No.: US 10,549,249 B2
(45) Date of Patent: Feb. 4, 2020

(54) SCALE COLLECTION DEVICE FOR DOWNFLOW REACTORS

(71) Applicant: UOP LLC, Des Plaines, IL (US)

(72) Inventors: Zhanping Xu, Inverness, IL (US); Steven J. Lesniak, Chicago, IL (US); Robert L. Bunting, Jr., Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/221,241

(22) Filed: Dec. 14, 2018

(65) Prior Publication Data

US 2019/0232244 A1 Aug. 1, 2019

Related U.S. Application Data

(60) Provisional application No. 62/609,295, filed on Dec. 21, 2017.

(51) Int. Cl.
*B01J 8/00* (2006.01)
*B01D 24/12* (2006.01)

(52) U.S. Cl.
CPC .......... *B01J 8/0085* (2013.01); *B01D 24/12* (2013.01); *B01J 8/006* (2013.01); *B01D 2101/00* (2013.01); *B01J 2204/002* (2013.01)

(58) Field of Classification Search
CPC .......... B01J 8/0085; B01J 8/008; B01J 8/006; B01D 24/12
See application file for complete search history.

(56) References Cited

U.S. PATENT DOCUMENTS

| | | | |
|---|---|---|---|
| 3,607,000 A | 9/1971 | Beal et al. | |
| 4,380,529 A | 4/1983 | Gupta | |
| 4,836,989 A | 6/1989 | Aly et al. | |
| 5,484,578 A * | 1/1996 | Muldowney | B01D 3/008 261/113 |
| 8,181,942 B2 | 5/2012 | Sechrist | |
| 8,487,151 B2 | 7/2013 | Koudil et al. | |
| 8,673,246 B2 | 3/2014 | Chen et al. | |
| 9,364,810 B2 | 6/2016 | Merkel et al. | |
| 9,480,957 B2 * | 11/2016 | Bazer-Bachi | B01J 8/0492 |
| 2011/0201856 A1 * | 8/2011 | Cottard | B01J 8/006 585/250 |

(Continued)

FOREIGN PATENT DOCUMENTS

| | | |
|---|---|---|
| CN | 103131472 A | 6/2013 |
| WO | 2006076923 A1 | 7/2006 |

(Continued)

OTHER PUBLICATIONS

International Search Report and Written Opinion from corresponding PCT Application No. PCT/US2018/066666, dated Apr. 4, 2019.

(Continued)

*Primary Examiner* — Lessanework Seifu

(57) ABSTRACT

The invention involves a scale collection device that is located within downflow reactor head for removing solids from feed streams to increase reactor operating cycle time without impact on effective reactor space for catalyst loading. More particularly, a filtering zone is located in an upper portion of a reactor vessel above a rough liquid distribution tray and a distribution tray.

13 Claims, 1 Drawing Sheet

(56) References Cited

U.S. PATENT DOCUMENTS

2017/0015917 A1* 1/2017 Muller ................ B01J 8/0492

FOREIGN PATENT DOCUMENTS

| WO | 2007023225 A1 | 3/2007 |
|---|---|---|
| WO | 2015036066 A1 | 3/2015 |

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.

* cited by examiner

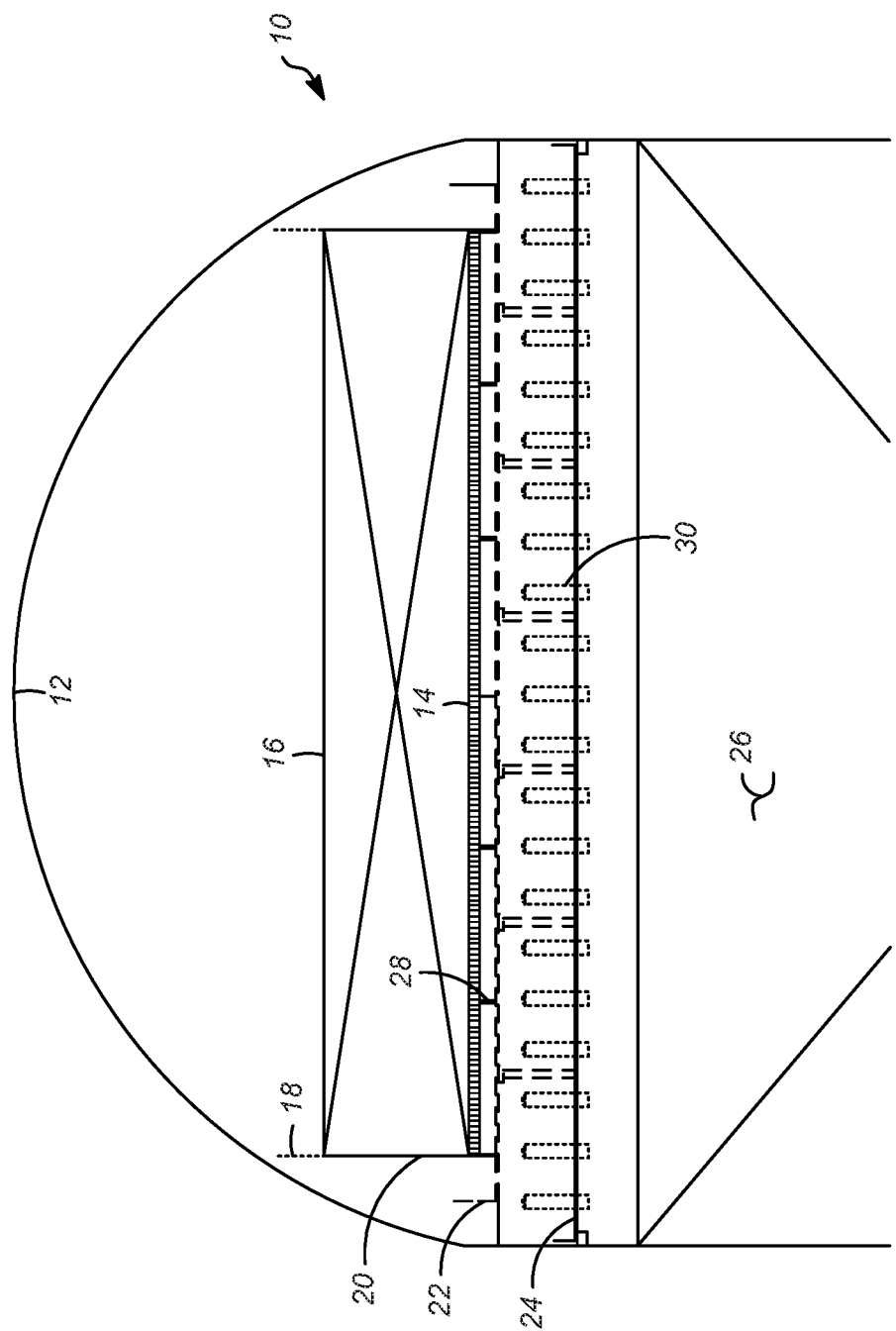

SCALE COLLECTION DEVICE FOR DOWNFLOW REACTORS

CROSS-REFERENCE TO RELATED APPLICATION

This application claims priority from U.S. Provisional Application No. 62/609,295 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within downflow reactor head for removing solids from feed streams to increase reactor operating cycle time without impact on effective reactor space for catalyst loading.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to take up. In addition, the filtering material has to be removed and replaced within an operating cycle when solids accumulates within the layer of filtering material or between the filtering material and catalyst bed causing high pressure drop.

SUMMARY OF THE INVENTION

The invention involves a reactor comprising an upper portion and a lower portion wherein the upper portion contains a scale collection device. A filtering zone is located above a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The filtering zone may be spaced above the rough liquid distribution tray by a plurality of spacers.

BRIEF DESCRIPTION OF THE DRAWING

The FIGURE shows the upper portion of a reactor showing filtering material located above the distribution trays.

DETAILED DESCRIPTION OF THE INVENTION

It has now been found that a different arrangement is preferred to filter particles from a feed stream in a downflow reactor. In addition to having a layer of filtering material on top of the catalyst, it has been found advantageous to include a layer of filtering material in the upper portion of the reactor above the distribution trays. More particularly, a scale collection device is located within an upper portion of a downflow reactor or reactor head for removing solids from feed streams and to increase reactor operating cycle time without any impact on the amount of effective reactor space for catalyst loading. This is achieved by a specially designed scale collection device located within a reactor head. As shown in the FIGURE, the scale collection device is constructed with a cylindrical side wall and a grating at bottom spaced a small distance above a rough liquid distribution tray (RLDT). A filtering material fills the space above grating and inside the cylindrical side wall. There may be a hold-down grid at top of the filtering material to keep it from moving around. The top of cylindrical side wall is notched for controlling liquid overflow around the top of the wall in case that the filter bed is plugged with solids restricting liquid flow through the bed. The overflow liquid is intercepted by a larger-diameter rough liquid distribution tray below for redistributing liquid across the tray to a vapor-liquid distribution tray below.

Gas and liquid enter into the reactor through an inlet distributor. The inlet flow stream may be straightened vertically downwards by an orifice plate at top of the distributor. The liquid is distributed across the top of the filtering material. Gas is separated from liquid in the space between the inlet distributor and top of the filtering material. The liquid flows downward through the filtering material while the gas through an open annular area between the cylindrical side wall and reactor head. With gas bypassing the filtering material, the pressure drop will not increase even with the filtering material filled with solids.

With this design, the reactor cycle time can be increased by the additional filter bed within top reactor head or catalyst loading increased by reducing the filter material on top of the catalyst bed. Liquid should be distributed uniformly across top of the filter bed to maximize its solid removal capability.

The liquid out of the scale collection device is redistributed by the rough liquid distribution tray below. Gas and liquid are then distributed through a vapor-liquid distribution tray in fluid communication with the rough liquid distribution tray to the catalyst bed.

The rough distribution tray includes an upper liquid retention baffle.

As shown in the FIGURE, according to one or more embodiments of the present invention, in order to remove the scales and fines in a liquid stream from within reactor 10 is shown an outer reactor shell having a rounded upper portion. The lower portion of reactor 10 contains a catalyst bed 26. A filtering zone 16 is shown on top of grating 14. The grating is supported by several supports 28 and is located a small distance above rough liquid distribution tray 22 that has a series of openings. Sections of the grating are placed within the cylindrical side wall for supporting filtering material in filtering zone 16. The cylindrical side wall is attached to a rough liquid distribution tray 22. The grating is mostly open (over 50%) for liquid to flow through to the rough liquid distribution tray. The top 18 of cylindrical side wall 20 of the filtering zone 16 has openings, such as triangular or rectangular openings for liquid overflow in the event that the filtering bed is plugged by solids. The overflow liquid is intercepted by the larger-diameter rough liquid distribution tray 22. The liquid then passes down from rough liquid distribution tray 22 to a vapor-liquid distribution tray 24 that is shown as having a number of distributors 30. Gas and liquid then pass below into catalyst bed 26. The filtering zone 16 is designed so that the supports of the grating provide minimal resistance to radial liquid flow on rough liquid distribution tray 22 so that liquid can be re-distributed across the tray.

The filter material used in the filtering zone may comprise pellets, sheets or other configuration of a porous material as known in the art. Preferred materials for the filtering zone are ceramic pellets which have a high internal porosity, such as the products available from Crystaphase Technologies, Inc., located in Houston, Tex. USA. Other filtering materials may be used, for example, membrane filters, sand filters, and other similar filter materials. In accordance with a preferred embodiment, the filtering zone contains one or multiple layers of filter materials with the same or different physical and chemical properties. The grating or grating with a wire mesh sheet above, upon which the porous material is supported has openings that are smaller than the size of the porous material pellets or other configuration.

With respect to the collection of the solid materials from the liquid, the configuration also reduces the tendency of rough liquid distribution tray 22, and vapor-liquid distribution tray 24 being plugged by solids. The quality of liquid distribution through the rough liquid distribution tray 22 and vapor-liquid distribution tray 24 was also found improved due to the reduced turbulent of liquid on the rough liquid distribution tray by the scale collection device above the rough liquid distribution tray 22.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains a scale collection device wherein a filtering zone is located above a rough liquid distribution tray and wherein a vapor-liquid distribution tray is located below the rough liquid distribution tray. An embodiment of the invention is one, any or all of prior embodiments in this paragraph up through the first embodiment in this paragraph, wherein the lower portion contains a catalyst bed. An embodiment of the invention is one, any or all of prior embodiments in this paragraph up through the first embodiment in this paragraph, wherein the lower portion contains a medium. An embodiment of the invention is one, any or all of prior embodiments in this paragraph up through the first embodiment in this paragraph, wherein the lower portion contains a packing. An embodiment of the invention is one, any or all of prior embodiments in this paragraph up through the first embodiment in this paragraph, wherein the filtering zone comprises one layer of filtering material having the same physical and chemical properties. An embodiment of the invention is one, any or all of prior embodiments in this paragraph up through the first embodiment in this paragraph, wherein the filtering zone comprises multiple layers of filtering material having different physical and chemical properties. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein the filtering zone is spaced above the rough liquid distribution tray by a plurality of spacers. The apparatus reactor wherein the spacers are coupled to the rough liquid distribution tray and the vapor-liquid distribution tray. The apparatus reactor wherein the vapor-liquid distribution tray comprises a plurality of distributors. An embodiment of the invention is one, any or all of prior embodiments in this paragraph up through the first embodiment in this paragraph, wherein the rough liquid distribution tray contains holes sized to generate the desired liquid level on the rough liquid distribution tray.

A second embodiment of the invention is an apparatus comprising an upper portion and a lower portion wherein the upper portion contains a scale collection device wherein a filtering zone is located above a rough liquid distribution tray and wherein a vapor-liquid distribution tray is located below the rough liquid distribution tray, wherein the vapor-liquid distribution tray comprise a plurality of distributors, and wherein the lower portion contains a catalyst bed. An embodiment of the invention is one, any or all of prior embodiments in this paragraph up through the second embodiment in this paragraph, wherein the rough liquid distribution tray contains holes sized to generate the desired liquid level on the rough liquid distribution tray.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion wherein the upper portion comprises:
    a rough liquid distribution tray comprising a cylindrical wall spaced apart from a reactor wall and a perforated bottom plate;
    a scale collection device within the rough liquid distribution tray, the scale collection device comprising a cylindrical sidewall and a bottom grating defining a filtering zone, wherein the scale collection device is spaced above the rough liquid distribution tray by a plurality of spacers, and wherein a diameter of the scale collection device is smaller than a diameter of the rough liquid distribution tray; and
    a vapor-liquid distribution tray located below the rough liquid distribution tray and wherein the vapor-liquid distribution tray comprises a plurality of distributors.

2. The reactor of claim 1, wherein the lower portion contains a catalyst bed.

3. The reactor of claim 1, wherein the lower portion contains a medium.

4. The reactor of claim 1, wherein the lower portion contains a packing.

5. The reactor of claim 1, wherein the filtering zone comprises one layer of filtering material having the same physical and chemical properties.

6. The reactor of claim 1, wherein the filtering zone comprises multiple layers of filtering material having different physical and chemical properties.

7. The reactor of claim 1, wherein the filtering zone comprises porous ceramic pellets.

8. The reactor of claim 1, wherein the scale collection device is spaced above the rough liquid distribution tray by a plurality of spacers.

9. The reactor of claim 8, wherein the spacers are coupled to the rough liquid distribution tray.

10. The reactor of claim 1, wherein the vapor-liquid distribution tray comprises a plurality of distributors.

11. The reactor of claim 1, wherein the rough liquid distribution tray contains holes sized to generate the desired liquid level on the rough liquid distribution tray.

12. An apparatus comprising an upper portion and a lower portion wherein the upper portion comprises:
- a rough liquid distribution tray comprising a cylindrical wall spaced apart from a reactor wall and a perforated bottom plate;
- a scale collection device within the rough liquid distribution tray, the scale collection device comprising a cylindrical sidewall and a bottom grating defining a filtering zone, wherein the scale collection device is spaced above the rough liquid distribution tray by a plurality of spacers, and wherein a diameter of the scale collection device is smaller than a diameter of the rough liquid distribution tray; and
- a vapor-liquid distribution tray located below the rough liquid distribution tray, wherein the vapor-liquid distribution tray comprise a plurality of distributors, and wherein the lower portion contains a catalyst bed.

13. The apparatus of claim 12, wherein the rough liquid distribution tray contains holes sized to generate the desired liquid level on the rough liquid distribution tray.

\* \* \* \* \*